April 15, 1941. G. A. TINNERMAN 2,238,664
HEAVY-DUTY SHEET METAL NUT
Filed July 8, 1939
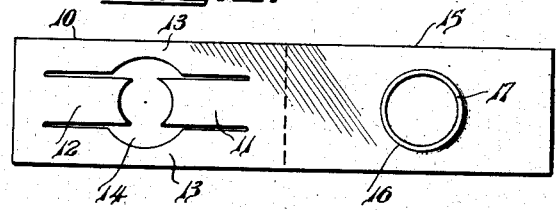
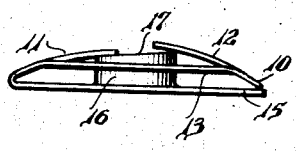
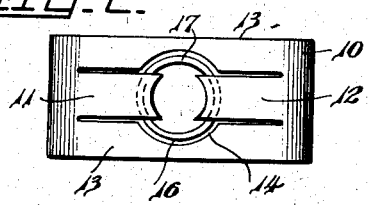
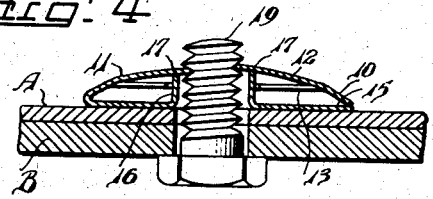
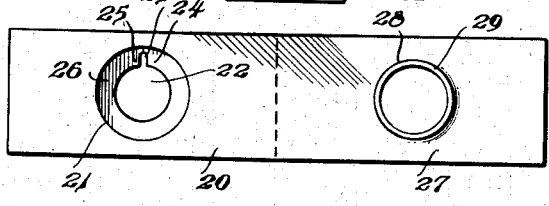
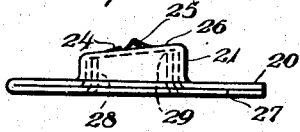
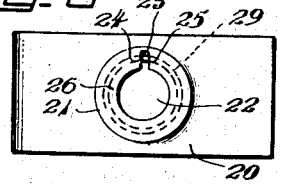
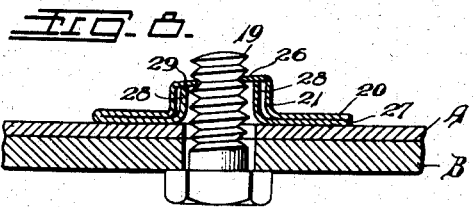
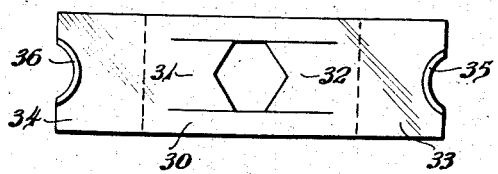
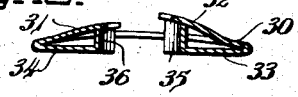
Inventor
GEORGE A. TINNERMAN
By H. G. Lombard
Attorney Patented Apr. 15, 1941

2,238,664

UNITED STATES PATENT OFFICE 2,238,664

HEAVY-DUTY SHEET METAL NUT

George A. Tinnerman, Rocky River, Ohio, assignor, by mesne assignments, to Tinnerman Products, Inc., Cleveland, Ohio, a corporation of Ohio Application July 8, 1939, Serial No. 283,475

17 Claims. (Cl. 85—36)

This invention deals in general with various type of heavy-duty sheet metal nut devices adapted to be used with a bolt, screw or similar threaded fastener in the manner of a substantial nut to provide a self-locking fastening installation in which the threaded fastener is secured against reverse rotation or unscrewing after the same has been turned to its ultimate holding position.

Sheet metal fasteners of this character are usually provided with a basic nut portion comprising thread engaging means in the form of tongues and the like, designed to engage at least a full, single thread of the threaded fastener. In the simplest form of such devices, the thread engaging means of the basic nut portion is designed to take the major portion of the thrust and strain on tightening of the bolt or screw, while certain other types of such sheet metal fasteners have been designed with means engaging more than one thread of the bolt, whereby the thrust is taken up at spaced points along the bolt shank such that the thread engaging means of the basic nut will be relieved of a proportionate amount of strain when the bolt is fully tightened.

In this way a sheet metal fastener may be provided with a certain amount of added strength for use in securing ordinary medium and light weight parts. However, where the fastener is used to secure heavy parts as, for example, in certain automobile assemblies, the bolt fastening must necessarily be tightened to a considerably greater degree which, of course, results in a proportionately greater strain on the thread engaging means of the sheet metal fastener.

In such installations for securing heavy parts, it has been found that when the bolt is drawn taut in the final tightening thereof, the bolt thread engaging means of the basic nut portion of the sheet metal fastener have a tendency to become mutilated and even collapse when the bolt is turned to its extreme limit of tightening. Under such circumstances, there is, of course, a danger that the thread engaging means of the basic nut will give way entirely after an assembly has been put to use and the bolt subjected to the usual stresses which cause even more strain to be exerted on the thread engaging means of the basic nut. Once such thread engaging means of the basic nut portion of the device become ineffective to carry the major portion of the thrust for which they were initially designed, any other bolt engaging elements provided in the device naturally become ineffective under the added burden with the result that the fastener eventually works loose and fails to serve its purpose.

The present invention contemplates a sheet metal fastener having means for engaging one or more threads on the bolt or other threaded fastener as desired, but which, in any event, has provided for the thread engaging elements of the basic nut portion thereof, a reinforcing means designed to support the extremities of the thread engaging means throughout substantially their entire thread engaging portions in accordance with inclination of the bolt threads and the general line of threaded engagement thereof with such bolt threads. In other words, by the use of a reinforcing means designed to support the thread engaging elements on a helix corresponding substantially to that of the threads of the bolt or other threaded fastener, such thread engaging elements are adapted to evenly and uniformly engage the bolt thread in a manner to withstand the extreme limit to which the bolt can be tightened and secured in positive, self-locking threaded engagement therewith. In fact, this construction has been found to be of such strength as to strip the thread of the bolt or screw without damaging the sheet metal nut device and even cause a shearing or fracture of the shank of the threaded fastener before any appreciable distortion or mutilation of the thread engaging means thereof takes place.

A primary object of the present invention, therefore, is to provide a simple, inexpensive sheet metal fastener especially suited for securing heavy parts, the same comprising, generally speaking, a basic nut portion having a reinforcing means for the thread engaging elements thereof and supporting the extremities of the same evenly and uniformly in threaded engagement with the bolt or screw threads against distortion and mutilation as the bolt is advanced to its extreme limit of tightening.

Another principal object is to provide such a sheet metal fastener having reinforcing means in the form of an upstanding abutment or the like, the upper edge or edges of which lie on a helix corresponding substantially to that of the bolt or screw threads such that the extremities of the thread engaging means thereof are supported on a similar helix corresponding generally to that of the bolt threads for uniform threaded engagement therewith throughout.

Further objects and advantages of the invention and other new and useful features in the construction, arrangement and general combination of elements in the various forms of the invention will be readily apparent to those skilled in the art as a description thereof proceeds with reference to the accompanying drawing in which like reference characters designate like parts throughout the same, and in which:

Fig. 1 represents a blank as prepared for providing one form of fastening device of the invention;

Fig. 2 is a top plan of a sheet metal nut fastening device as completed from the blank represented in Fig. 1;

Fig. 3 is an edge elevation of the completed sheet metal nut per se; and,

Fig. 4 is a sectional view showing the use of the sheet metal nut in an installation.

Fig. 5 represents a blank as prepared for providing another form of sheet metal nut device;

Fig. 6 is a top plan view of a sheet metal nut device as completed from the blank of Fig. 5;

Fig. 7 is an edge elevation of this form of the nut device per se; and,

Fig. 8 is a sectional view showing the sheet metal nut of Fig. 7 as employed in an installation.

Fig. 9 represents a blank as prepared for a further form of sheet metal nut device;

Fig. 10 is a sectional view of a completed nut formed from the blank of Fig. 9; and Fig. 11 is a sectional view of a two-piece type of sheet metal nut in accordance with the invention.

Fastening means provided in sheet metal in accordance with the present invention comprises, generally, cooperating thread engaging elements so formed as to coact with the thread of a bolt, screw or other threaded member applied thereto under tension and with progressively increasing binding action as the threaded member is drawn taut. This binding action becomes most pronounced and positive when the threaded member is driven home to tightened fastening position to the extent that the extremities of the cooperating thread engaging elements snugly engage the thread substantially throughout and dig into and become embedded in the root of the threaded member thereby providing a locked fastening engagement from which the threaded member cannot work loose under extraordinary conditions of wear, vibration and strain and over long periods of use.

It has been found in the art of securing sheet metal parts by bolts and screws, that the mere provision of an opening is a sheet metal piece to receive a threaded member is not effective to provide a fastening means in which a threaded member may be applied and drawn up as necessary to provide a tight, rigid installation. However, as disclosed herein, if such an opening is provided in conjunction with distinct elements which are struck and formed to project materially out of the plane of the sheet metal, such projecting elements serve to bolster the thread engaging extremities thereof and thus prevent the same from being pulled through onto the reverse side of the sheet when a threaded fastening member is applied thereto and drawn taut.

In several prior patents, applicant has disclosed various methods and constructions for such sheet metal fastening devices but in each case the thread engaging elements of the basic nut, that is, the nut member or portion immediately adjacent the part secured, are unsupported and the fastening action with the bolt or screw designated to take place solely by the inherent strength of such thread engaging elements.

By the present invention, customary methods of making the essential thread engaging means of the basic nut may be followed, if desired, in manufacturing any selected type of fastener embodying reinforcing means for supporting the extremities of such thread engaging means for most effective threaded fastening engagement with the threads of the bolt or screw, especially when the same is rotated to its extreme limit of tightening as is required in securing heavy parts or the members of assemblies subject to rough usage and continuous vibration and jarring effects. More specifically, such bolt engaging means may be provided in the manner of one, two, or more substantial tongues presenting a generally round or diamond shaped opening therebetween for threadedly engaging the threads of a threaded fastener in the manner of a nut. Such fastening means are particularly advantageous in that such tongues may be made yieldable and thereby readily adapted to receive a cooperating threaded bolt fastening member, or the like, applied thereto in a substantial direct, axial thrust or ratchet like action and then rotated a quarter turn or more as necessary to tighten and lock in such home position. Other types of such thread engaging means may be provided in the form of protuberances which are apertured to provide a thread engaging portion and otherwise assume a generally conical or cylindrical wall configuration projecting out of the plane of said sheet metal section from which they are struck and formed. The reinforcing means may be provided in any selected shape or manner to support the thread engaging means provided as aforesaid, in the most practical manner for obtaining the most effective threaded fastening engagement with the bolt or screw. Such reinforcing means may assume the form of a substantial abutment comprising a struck up lug, hub, collar, or the like, preferably having the upper edges thereof so designed as to maintain the thread engaging means supported thereby on a helix corresponding substantially with that of the threads of the threaded fastener employed. Thus, the thread engaging means of the basic nut are adapted not only to withstand a considerably greater degree of strain on rotation of the threaded fastener to its extreme limit of tightening, but the original, essential helical formation of the extremities thereof is more or less preserved during the bolt tightening operation, thereby minimizing possibility of stripping of the bolt threads. In this relation, the most effective fastening engagement of said thread engaging means in uniform, threaded engagement with the bolt threads is ensured in providing a self-locking fastening installation which is particularly suited for heavy duty work inasmuch as the bolt or screw may be rotated to its extreme limit of tightening with little likelihood of stripping the threads thereof and without danger of mutilating or distorting the thread engaging means of the sheet metal nut out of the initial, preformed configuration of the extremities thereof on a helix corresponding substantially to that of the bolt or screw threads.

Referring now more particularly to the drawing, Figs. 1 to 4 inclusive illustrate one form of the improved sheet metal fastening device of the invention constructed from a blank such as represented in Fig. 1 which may be of any selected size and form proportionate to the size and shape of the parts to be secured; preferably the blank is provided from a relatively small, inexpensive, substantially rectangular section of sheet metal which may be severed from ordinary metal strip stock without loss or waste of material whatsoever. Any suitable sheet metal may be employed but preferably that of spring metal nature such as spring steel or cold rolled steel having spring characteristics and which, of course, is usually of a much greater tensile and compressive strength than the material of the parts secured by the fastening device. The thickness of the sheet metal section is usually slightly less than that of the pitch or spacing between adjacent threads of the threaded fastener employed with the completed sheet metal nut device in a manner presently to be described.

By suitable slitting, punching and bending operations, the sheet metal section thus provided is formed substantially as shown in Fig. 1 into a basic nut or locking plate portion 10 and a reinforcing portion 15. The basic nut portion 10 is provided with substantial tongues 11, 12 or the like thread engaging means pressed, extruded or otherwise struck and formed therefrom to project out of the plane thereof between the side or bridge portions 13 providing the general body of the basic nut portion. Said tongues 11, 12, in Fig. 1, are formed to project downwardly of the sheet metal section and present therebetween an opening adapted to receive the bolt or other threaded fastener; in their final form, the tongues assume a substantial ogee formation with the extremities thereof presenting a generally round opening and being so spaced as to lie on a helix corresponding substantially to that of the threads of the threaded fastener to be employed for most effective uniform threaded fastening engagement therewith throughout. In the area of the extremities of the tongues 11, 12 an enlarged aperture 14 is provided for a purpose hereinafter appearing, this aperture being substantially concentrically arranged with respect to the opening between the tongue extremities.

The reinforcing portion 15 of the device comprises a substantial abutment means which, in the present illustration, assumes the form of an upstanding hub or collar 16, the upper edge 17 of which, Fig. 3, is designed to lie on a helix corresponding substantially with that of the threads of the threaded fastener to be used. The blank of Fig. 1, thus prepared, is bent upon itself in the area represented by the dotted line to provide the general form of device shown in Figs. 2 and 3 wherein the upstanding collar or hub 16 is received in the aperture 14 of the basic nut 10 and projects therethrough to engage the underfaces of the tongues 12, 13 adjacent the extremities thereof. In this relation, since the upper edge 17 of the hub or collar 16 is disposed on a helix and the tongue extremities, as stated, are also disposed on a helix corresponding substantially to that of the bolt threads, said hub serves to support the tongues in their initially formed relation and otherwise maintains the extremities thereof on a predetermined helix corresponding generally to that of the bolt threads at all times, especially during the final tightening operation of the bolt.

The foregoing perhaps is best illustrated in Fig. 4 representing an installation in which apertured parts A, B, are secured by a bolt 19 or other threaded fastener, passed through the apertures in such parts to threadedly engage the tongues 11, 12 of the basic nut portion 10 of the sheet metal device. In the initial turning of the bolt, the tongues 11, 12 will, of course, be drawn tightly against the upper edge 17 of the collar or hub 16 which thereupon serves to reinforce said tongues and prevent the same from collapsing or becoming distorted as the bolt is rotated to its ultimate fastening position. In this relation, the tongues are subjected to a great degree of strain upon rotation of the bolt to its extreme limit of tightening, and it is essential for satisfactory results in heavy duty assemblies, that the tongue extremities exert an even, uniform stress on the bolt thread in order to minimize possibility of stripping thereof. It is therefore necessary that the extremities of the tongues be supported on a helix corresponding to that of the bolt thread during the final tightening operation, and to this end, the top or upper edge 17 of the abutment means comprising reinforcing collar or hub 16 is formed on such a helix.

The extreme advantage and, in fact, necessity of this structure will be readily appreciated when it is considered that if the upstanding collar, hub or other abutment supported the tongue extremities in substantially the same plane, or perhaps, supported only one tongue effectively on full tightening of the bolt, an unequal stress would be exerted on the bolt thread and the tongues would necessarily have the tendency to become twisted from their initial formation which, of course, would result in the extremities of the tongues cutting angularly into the bolt thread to cause eventually a complete stripping thereof.

Preferably, the extremities of the tongues 11, 12 are so formed as to present a substantially round opening therebetween and thereby be adapted to threadedly engage the bolt thread around a major portion of the periphery of the bolt shank. With this arrangement together with the upstanding hub or collar 16 supporting the tongue extremities on a helix corresponding substantially to that of the bolt thread, as aforesaid, an even uniform threaded engagement of such tongue extremities with the bolt thread throughout is ensured such that there is little possibility of stripping or mutilating the thread of the bolt as it is rotated to its fully tightened position.

Though the use of substantial tongues 11, 12 is preferred, such integral bolt or screw thread engaging means in the basic nut or locking plate portion of the fastening device may, of course, be provided in any other suitable form or construction depending on the strength required and the use to which the device is put, so long as they threadedly engage with the bolts as they are driven home. However, it has been found that such thread engaging means prepared in the form of cooperating tongues 11, 12, as shown, are the most efficient and most practical in that they are possessed of unusual inherent strength and will not loosen from fastening engagement under constant strain, heavy usage and rough handling of an installation in which the fasteners are used. This is possible by reason of the fact that the sheet metal material of the fastening device from which such tongues are formed, is of less thickness than the pitch or spacing of the screw threads and such tongues tend, more effectively, to move toward each other and dig into the grooves intermediate adjacent threads on tightening of the bolt or screw and otherwise become embedded in the root diameter of such threaded member in locked, frictional fastening engagement therewith in applied fastening position. Thus, any vibration, jarring or strain taking place in a completed mounting cannot cause displacement, reverse rotation or tend toward unscrewing of the threaded member from applied fastening position. It will therefore be appreciated that in the provision of such integral thread engaging elements in the fastening devices of the present invention, the use of individual threaded nuts or lock washers of any kind is entirely dispensed with thereby making for a considerable saving not only in the cost of such nuts and lock washers, but also materially reducing the expense and labor involved in the tedious, time-consuming assembling operations which such fastenings require.

Figs. 5 to 8 inclusive show another form of sheet metal nut fastening device of the invention which may be constructed from a blank such as represented in Fig. 5 to comprise a basic nut portion 20 having bolt thread engaging means provided in the manner of a generally cylindrical or conical protuberance 21 or the like. The protuberance is formed with a central bolt receiving aperture 22 having at least one radial slot 23 providing substantial tongues 24, 25. These tongues are suitably bent as illustrated in Fig. 7, in a manner to dispose the marginal edge of the aperture 22 on a helix corresponding substantially to that of the threads of the bolt or other threaded fastening member. The peripheral edge portion 26 adjacent the aperture 22 thus constitutes one convolution of a cylindrical helix and in threading the bolt or screw into engagement therewith, the bolt thread passes through the radial slot 23 between the tongues 24, 25 and otherwise threadedly engages the marginal edge 26 of the aperture evenly and uniformly throughout the periphery thereof.

The reinforcing portion 27 of the device comprises an abutment provided preferably in the manner of an upstanding collar or hub 28, the upper edge 29 of which is formed on a helix corresponding substantially to that of the bolt thread. In the initial formation of the blank as shown in Fig. 5, it will be understood that the protuberance 21 is formed to project from the plane of the blank in a direction opposite to that of said hub or collar 28. Accordingly when the blank is folded in the area of the dotted line, Fig. 5, the completed nut device appears as in Figs. 6 and 7, with the protuberance 21 telescoped over the hub 28 such that those areas 26 adjacent the aperture 22 rest on the upper edge 29 of the hub 28 as best seen in Fig. 8, and which edge, as stated, is disposed on a helix corresponding substantially to that of the bolt thread. Thus, when the bolt fastening 19, Fig. 8, is applied to the thread engaging means 26 presented by the marginal edge of the aperture 22, the upstanding hub 28 serves to reinforce said thread engaging means 26 and otherwise prevent the same from collapsing or becoming distorted as the bolt is rotated to its extreme limit of tightening, substantially in the manner described with reference to the form of the invention shown in Figs. 1 to 4 inclusive.

Figs. 9 and 10 show another form of the invention wherein the basic nut 30 provided with struck out thread engaging means in the form of tongues 31, 32, similar to those shown in Fig. 2, is provided with end sections 33, 34, each of which is provided with an upstanding shoulder 35, 36 respectively. When the end sections are bent to the underside of the basic nut as shown in Fig. 10, these shoulders 35, 36 together form the upstanding hub or the like abutment means for reinforcing the tongues 31, 32 of the basic nut. Preferably the upper edge of each of said shoulders is so designed as to support the extremities of the tongues 31, 32 on a helix corresponding substantially with that of the thread of the bolt or other threaded fastening employed therewith in a manner and for the purpose explained in the previously described forms of the invention.

Fig. 11 shows a modification wherein the basic nut 40 comprising, for example tongues 41, 42, is provided as a distinct member together with flange portions 43, 44 which are bent over the ends of a separate reinforcing member 45 to hold the same in assembled relation therewith. The reinforcing member 45 includes abutment means in the form of an upstanding collar 46, or the like, adapted to support the extremities of the tongues 41, 42, on a helix corresponding substantially to that of the threads of the threaded fastener to provide a device having a function and use similar to that of the other forms of the invention. If desired, the separate basic nut and reinforcing members 40, 45 may be held together in the assembled relation shown in any other suitable way, as by welding, riveting or the like attaching means serving a purpose equivalent to that of the bent over flange portions 43, 44.

While throughout the description the sheet metal nut devices are referred to as constructed preferably of spring metal, it is to be understood as fully contemplated within the scope of this invention, that such devices be provided from any other suitable material such as cold-rolled metal having sufficient resiliency and other spring-like characteristics permitting its use in the manner and for the purposes aforesaid.

In providing the nut devices from tempered spring steel, there is, of course, a considerable advantage over cold rolled metal in that greater strength and durability is provided and an effective self-locking action of the bolt or screw fastening with the thread engaging means thereof is obtained. A further advantage resides in the fact that the thread engaging means provided in a spring metal locking plate are necessarily possessed of such hardness as to withstand mutilation and distortion on any reasonable tightening of a threaded fastening member in locking engagement therewith; thus, when it is desirable or necessary to dismount an assembly for repairs or replacement of a damaged part, the bolt fastening may be removed without destroying the sheet metal nut device or otherwise injuring the thread engaging means thereof such that it may be employed again in the same or a similar installation. This of course is not possible in the use of cold rolled metal which is relatively soft and ductile wherefore the bolt engaging means provided therein are distorted and mutilated in the initial application and tightening of a threaded fastening member therewith.

In certain installations, however, costs are of paramount importance as respects the application and use of such sheet metal nut devices whereupon it becomes necessary to construct the same of cheaper grade material such as cold rolled steel having spring-like properties. Such material, of course, does not have the strength and desirable qualities of tempered spring steel, but is sufficiently yieldable and resilient to permit the provision of nut devices having an application and use substantially equivalent to the various constructions disclosed herein. It is therefore to be understood that the invention, in no way, is limited by any reference in the description to the effect that the preferred forms are constructed of spring metal. It is also to be understood that the disclosure is not limited, in any manner or form, to the specific thread engaging means shown and described, it being obvious that equivalent types of such means, per se, adapted for use with any screw or bolt, may be embodied in numerous modifications within the spirit and scope of the invention without departing from the teachings or essential characteristics thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A structure adapted for self locking threaded engagement with a bolt or screw fastening member, said structure comprising a sheet metal basic nut portion including thread engaging means designed for threadedly engaging the fastening member and abutment means conforming generally to the thread helix of the fastening member and supporting said thread engaging means on a helix corresponding substantially to that of the thread of the fastening member for uniform threaded engagement therewith.

2. A structure adapted for self locking threaded engagement with a bolt or screw fastening member, said structure comprising a sheet metal basic nut portion having thread engaging means struck and formed therefrom designed for threadedly engaging the fastening member and upstanding abutment means having a supporting edge lying on a helix corresponding substantially with that of the thread of the fastening member, said supporting edge being in contact with said thread engaging means for supporting the same in even, uniform threaded engagement with said fastening member.

3. A structure adapted for self locking threaded engagement with a bolt or screw fastening member, said structure comprising a sheet metal basic nut portion provided with thread engaging means designed for threadedly engaging the fastening member and an upstanding abutment defining supporting means conforming generally to the thread helix of the fastening member and contacting the underface of said thread engaging means to support the same on a helix corresponding substantially to that of the thread of the fastening member in uniform threaded engagement therewith.

4. A structure adapted for self locking threaded engagement with a bolt or screw fastening member, said structure comprising a sheet metal basic nut portion provided with thread engaging means designed for threadedly engaging the fastening member and upstanding abutment means defining a substantial hub having an edge conforming generally to the thread helix of the fastening member and designed to contact the underface of said thread engaging means to support the same on a helix corresponding substantially to that of the thread of the fastening member in uniform threaded engagement therewith.

5. A structure adapted for self locking threaded engagement with a bolt or screw fastening member, said structure comprising a sheet metal basic nut portion having thread engaging means struck and formed therefrom designed for threadedly engaging the fastening member and a reinforcing portion comprising upstanding abutment means the supporting edge of which is disposed on a helix conforming generally to that of the thread of the fastening member and adapted to contact the underface of said thread engaging means to support the same in uniform threaded engagement with said fastening member.

6. A structure adapted for self locking threaded engagement with a bolt or screw fastening member, said structure comprising a sheet metal basic nut portion having thread engaging means pressed therefrom for threadedly engaging the fastening member, a reinforcing member underneath said basic nut portion, said reinforcing member comprising upstanding abutment means defining a supporting edge corresponding substantially to the thread helix of the threaded fastener and contacting the underface of said thread engaging means to support the same with the extremities thereof in uniform threaded engagement with the thread of the fastening member.

7. A structure adapted for self locking threaded engagement with a bolt or screw fastening member, said structure comprising a sheet metal basic nut portion having thread engaging means provided therefrom designed for threadedly engaging the fastening member, a reinforcing member underneath said basic nut portion, said reinforcing member comprising upstanding abutment means having a supporting surface conforming generally to the inclination of the thread of the fastening member, said abutment means being adapted to contact the underface of said thread engaging means to support the same with the extremities thereof on a helix corresponding substantially to that of the thread of the fastening member for uniform threaded engagement therewith.

8. A one-piece sheet metal structure adapted for self locking threaded engagement with a bolt or screw fastening member, said structure comprising a basic nut portion having thread engaging means provided therefrom designed for threadedly engaging the fastening member, a reinforcing portion underneath said basic nut portion, said reinforcing portion comprising upstanding abutment means pressed therefrom the supporting surface of which is disposed on an inclination conforming generally to the thread of the fastening member and adapted to contact the underface of said thread engaging means to support the same with the extremities thereof on a helix corresponding substantially to that of the thread of the fastening member for uniform threaded engagement therewith.

9. A structure adapted for self locking threaded engagement with a bolt or screw fastening member, said structure comprising a section of sheet metal bent upon itself to provide a basic nut portion overlying a reinforcing portion, said basic nut portion having thread engaging means provided therefrom designed for threadedly engaging the fastening member, and said reinforcing portion comprising an upstanding abutment defining means conforming generally to the thread helix of the fastening member to support said thread engaging means in threaded engagement with said fastening member.

10. A structure adapted for self locking threaded engagement with a bolt or screw fastening member, said structure comprising a section of sheet metal bent upon itself to provide a basic nut portion overlying a reinforcing portion, said basic nut portion having thread engaging means provided therefrom designed for threadedly engaging the fastening member, and said reinforcing portion comprising upstanding abutment means defining a supporting edge conforming generally to the thread helix of the fastening member and contacting the underface of said thread engaging means to support the same with the extremities thereof on a helix corresponding substantially to that of the thread of the fastening member for uniform threaded engagement therewith.

11. A structure adapted for self locking threaded engagement with a bolt or screw fastening member, said structure comprising a section of sheet metal bent upon itself to provide a basic nut portion overlying a reinforcing portion, said basic nut portion having thread engaging means provided therefrom designed for threadedly engaging the fastening member, and said reinforcing portion comprising upstanding abutment means the supporting surface of which is disposed on an inclination conforming generally to the thread of the fastening member and adapted to contact the underface of said thread engaging means to support the same with the extremities thereof on a helix corresponding substantially to that of the thread of the fastening member for uniform threaded engagement therewith.

12. A structure adapted for self locking threaded engagement with a bolt or screw fastening member, said structure comprising a section of sheet metal bent upon itself to provide a basic nut portion overlying a reinforcing portion, said basic nut portion having thread engaging means struck and formed therefrom comprising a pair of cooperating tongues designed for threadedly engaging the fastening member, and said reinforcing portion comprising an upstanding abutment defining means conforming generally to the thread helix of the fastening member to support said tongues in uniform threaded engagement with said fastening member.

13. A structure adapted for self locking threaded engagement with a bolt or screw fastening member, said structure comprising a section of sheet metal bent to provide a basic nut portion overlying a reinforcing portion, said basic nut portion having thread engaging means struck and formed therefrom comprising a tongue designed for threadedly engaging the fastening member, and said reinforcing portion comprising upstanding abutment means defining a supporting edge conforming generally to the thread helix of the fastening member and contacting the underface of said tongue to support the same with the extremity thereof on a helix corresponding substantially to that of the thread of the fastening member for uniform threaded engagement therewith.

14. A structure adapted for self locking threaded engagement with a bolt or screw fastening member, said structure comprising a section of sheet metal bent to provide a basic nut portion overlying a reinforcing portion, said basic nut portion having thread engaging means struck and formed therefrom comprising a pair of cooperating tongues designed for threadedly engaging the fastening member, and said reinforcing portion comprising upstanding abutment means the supporting surface of which is disposed on an inclination conforming generally to the thread of the fastening member and adapted to contact the underface of said cooperating tongues to support the same with the extremities thereof on a helix corresponding substantially to that of the thread of the fastening member for uniform threaded engagement therewith.

15. A structure adapted for self locking threaded engagement with a bolt or screw fastening member, said structure comprising a sheet metal basic nut portion and a reinforcing portion, said basic nut portion including an apertured protuberance having the marginal edge portion thereof formed into a thread engaging means, and said reinforcing portion comprising an upstanding abutment defining means conforming generally to the thread helix of said fastening member to contact and support said thread engaging means in threaded engagement with said fastening member.

16. A structure adapted for self locking threaded engagement with a bolt or screw fastening member, said structure comprising a sheet metal basic nut portion and a reinforcing portion, said basic nut portion including an apertured protuberance having the marginal edge portion thereof formed into a thread engaging means, and said reinforcing portion comprising an upstanding abutment means defining a supporting edge conforming generally to the thread helix of the fastening member and contacting the underface of said marginal edge portion to support the same on a helix corresponding substantially to that of the thread of the fastening member for uniform threaded engagement therewith.

17. A structure adapted for self locking threaded engagement with a bolt or screw fastening member, said structure comprising a sheet metal basic nut portion and a reinforcing means therefor provided from end sections on said basic nut portion bent to the underside thereof, said basic nut portion including thread engaging means pressed therefrom for threadedly engaging said fastening member, and said reinforcing means comprising an upstanding abutment adapted to contact the underface of said thread engaging means to support the same in threaded engagement with said fastening member.

GEORGE A. TINNERMAN.